(12) United States Patent
Harris et al.

(10) Patent No.: US 8,529,991 B2
(45) Date of Patent: Sep. 10, 2013

(54) METHOD AND APPARATUS FOR CUTTING A PART WITHOUT DAMAGING A COATING THEREON

(75) Inventors: Geoffrey G. Harris, Midland (CA); Daniel B. Mitchell, Port McNicoll (CA); Douglas J. Brown, Midland (CA)

(73) Assignee: Raytheon Canada Limited, Ottawa, Ontario (CA)

( * ) Notice: Subject to any disclaimer, the term of this patent is extended or adjusted under 35 U.S.C. 154(b) by 1070 days.

(21) Appl. No.: 12/533,469

(22) Filed: Jul. 31, 2009

(65) Prior Publication Data

US 2011/0027473 A1 Feb. 3, 2011

(51) Int. Cl.
*B05D 5/06* (2006.01)

(52) U.S. Cl.
USPC .......... 427/162; 427/230; 427/164; 427/165; 427/289; 427/290; 118/44; 83/861; 83/845; 83/869; 83/33; 83/49; 83/39

(58) Field of Classification Search
USPC ................ 427/162, 230, 164, 165, 289, 290; 118/44; 83/861, 875, 869, 33, 49, 39
See application file for complete search history.

(56) References Cited

U.S. PATENT DOCUMENTS

| | | | | |
|---|---|---|---|---|
| 5,144,536 A * | 9/1992 | Tsukada et al. | | 361/765 |
| 6,495,053 B1 * | 12/2002 | Jalrazbhoy et al. | | 216/13 |
| 2003/0146196 A1 * | 8/2003 | Kurosawa et al. | | 219/121.72 |
| 2003/0168255 A1 * | 9/2003 | Kim et al. | | 174/261 |
| 2008/0013323 A1 * | 1/2008 | Katsumoto et al. | | 362/311 |
| 2008/0248254 A1 * | 10/2008 | Hagiwara et al. | | 428/167 |
| 2010/0027121 A1 * | 2/2010 | Takahara et al. | | 359/570 |

FOREIGN PATENT DOCUMENTS

JP         2002280534 A  *  9/2002

\* cited by examiner

*Primary Examiner* — Katarzyna Wyrozebski Lee
*Assistant Examiner* — Margaret Squalls
(74) *Attorney, Agent, or Firm* — Lando & Anastasi, LLP

(57) ABSTRACT

A method involves creating a recess in a surface of a part so the recess is adjacent a portion of the part, thereafter forming a coating on the surface of the part with a portion of the coating being disposed in the recess, and thereafter removing material of the portion of the part with a tool. According to a different aspect, an apparatus includes a recess-forming section that forms a recess in a surface of a part so the recess is adjacent a portion of the part, a coating section that forms a coating on the surface of the part with a portion of the coating disposed in the recess, and a material-removing section that subsequently removes material of the portion of the part with a tool.

17 Claims, 10 Drawing Sheets

METHOD AND APPARATUS FOR CUTTING A PART WITHOUT DAMAGING A COATING THEREON

FIELD OF THE INVENTION

This invention relates in general to techniques for cutting a part with a coating thereon and, more particularly, to techniques for cutting the part while avoiding undesirable damage to the coating.

BACKGROUND

There is often a need to cut a part that includes a substrate with a coating thereon. One example is an optical component having a substrate such as a lens, with a coating on one or both side surfaces of the lens. The coating may be an antireflective (AR) coating, a filter coating that passes some wavelengths and reflects other wavelengths, or a protective coating that helps avoid scratches or other physical damage to the substrate. Sometimes the substrate can be cut before it is coated, but this is not always possible, and in some cases it is not cost-effective to cut the substrate and then coat it. Consequently, it is sometimes necessary to cut the part at a point in time after the coating has been applied to the substrate.

A common problem is that the coating is often mechanically tougher than the substrate, and will tend to hold together and pull away from the substrate, rather than remain bonded to the substrate and be cut apart. For example, where a hole is to be drilled through a part, the drill first makes contact with the coating. The drill exerts not only a downward force on the coating, but also a twisting force. In some cases, the coating will hold together despite the force, and an irregular portion significantly larger than the intended hole will be pulled off the substrate. Alternatively, when a coating is cut with a saw, the coating will be pulled sideways where the saw contacts the coating, and irregular portions of the coating can be pulled off the substrate. Sometimes the damage is sufficiently significant that the part must be scrapped, thereby reducing the effective yield of the manufacturing process, and increasing the average cost per completed part. Consequently, while existing cutting techniques have been generally adequate for their intended purposes, they have not been entirely satisfactory in all respects.

BRIEF DESCRIPTION OF THE DRAWINGS

A better understanding of the present invention will be realized from the detailed description that follows, taken in conjunction with the accompanying drawings, in which.

DETAILED DESCRIPTION

Figure 1:
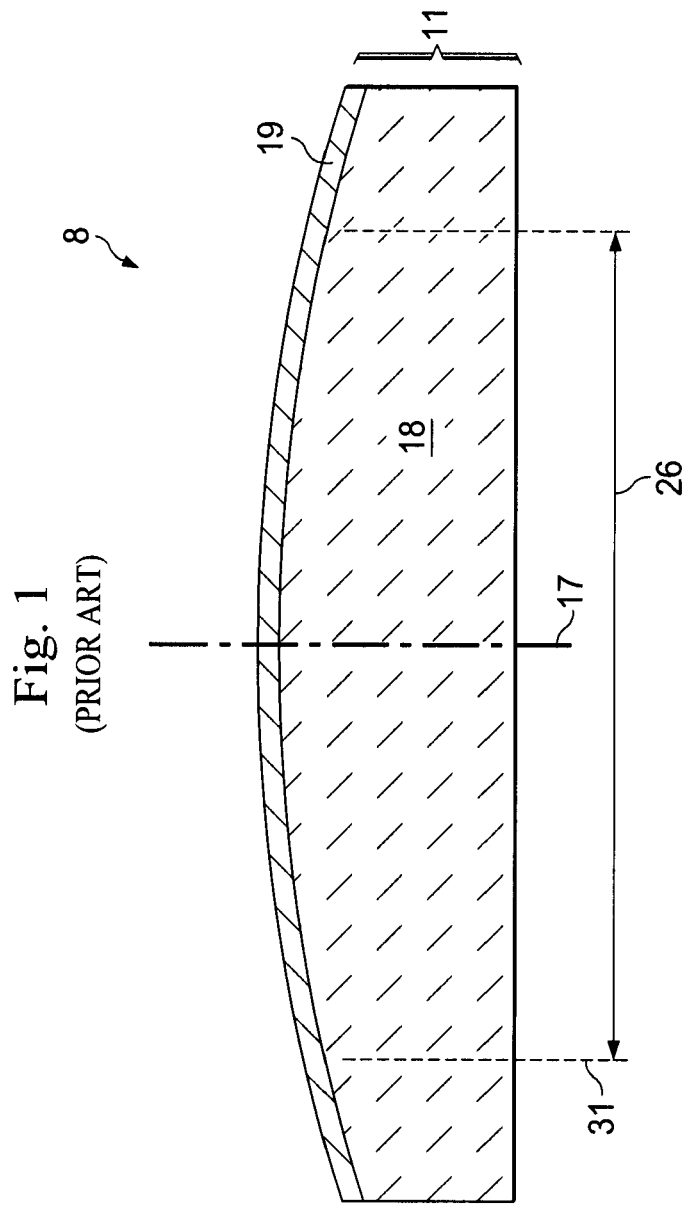
FIG. 1 is diagrammatic sectional view showing a conventional optical component that includes a substrate with a coating on one side thereof.

FIG. 1 is diagrammatic sectional view showing a conventional optical component 11. The drawings do not show all subject matter to scale, and in fact some characteristics are intentionally shown without proper scale for increased clarity.

The optical component 11 has an optical axis 17, a substrate 18, and a coating 19 on one side surface of the substrate 18. The substrate 18 is an optical lens made of a refractory material. The coating 19 may be any of a variety of different types of coatings that are known in the art, including but not limited to an antireflective (AR) coating, a filter coating that passes selected wavelengths and reflects other wavelengths, or a protective coating that is made of a material harder than the material of the lens 18, and that helps avoid scratches or other physical damage to the lens 18. The coating may be a single layer of one material, or may include multiple layers made of different materials.

During fabrication of the optical component 11, at a point in time after the coating 19 has been applied to the lens 18, the fabrication process may require that the lens 18 be cut, which also means that the coating 19 thereon must be cut. As one example, assume that the optical component 11 is to have a final diameter 26, such that a cut needs to be made along a cylindrical path 31 that is concentric to the axis 17. In other words, the annular portion of the component 11 that is disposed radially outwardly of the cylindrical path 31 will be cut off and discarded.

When attempting to make such a cut using conventional techniques, a common problem is that the coating 19 may suffer undesirable damage. In this regard, the coating 19 will often be made from a material that is mechanically tougher than the substrate 18, for example where the coating is a protective coating provided to physically protect the substrate. Accordingly, when an attempt is made to cut through the coating, the coating will often tend to hold together rather than be easily cut, such that relatively large sections of the coating may be pulled off the substrate 18. That is, a cutting operation will often cause damage to the coating that extends well beyond the specific point of impact of the cutting tool. This is even more pronounced where the entire cut is spaced inwardly from edges of the part, as opposed to a cut that begins at an edge of the part. In FIG. 1, this means that significant portions of the coating 19 located within the diameter 26 could be pulled off the substrate 18. One aspect of the present invention is the provision of a technique that minimizes or avoids this type of damage.

Figure 2:
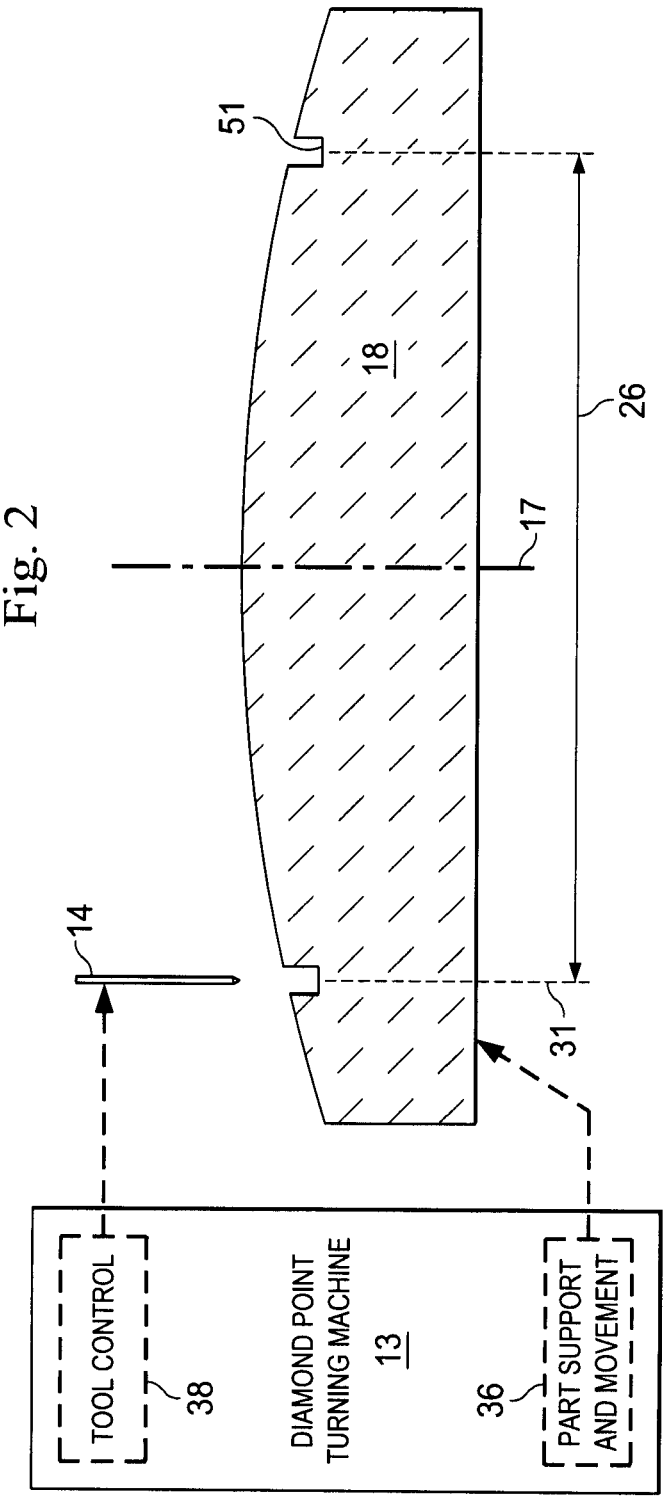
FIG. 2 is diagrammatic view, partially in section, showing an apparatus that embodies aspects of the invention, and that includes a diamond point turning (DPT) machine, and the substrate of FIG. 1 before formation of the coating.

FIG. 2 is diagrammatic view, partially in section, showing an apparatus 10 that embodies aspects of the invention, and that includes the lens 18 of FIG. 1 before formation of the coating 19, and a diamond point turning (DPT) machine 13. The DPT machine 13 is a conventional device, and includes a DPT tool 14. Before the substrate 18 is cut, and before the coating 19 is formed, a recess is created in the substrate where the substrate will be cut. In the specific example of FIG. 2, the recess is an annular groove 51 that is approximately radially aligned with the cylindrical path 31 of the intended cut. The DPT machine 13 is used to create this groove 51. However, it would alternatively be possible to use any other suitable type of equipment to create the groove. The DPT machine 13 includes a part support and part movement section 36 that supports the optical component 11, and that also rotates the optical component about the optical axis 17. The DPT machine 13 also includes a tool control section 38 that effects movement of the DPT tool 14 in relation to the optical component 11. In particular, the tool control section 38 can selectively move the tool 14 both axially and radially with respect to the axis 17.

Figure 3:
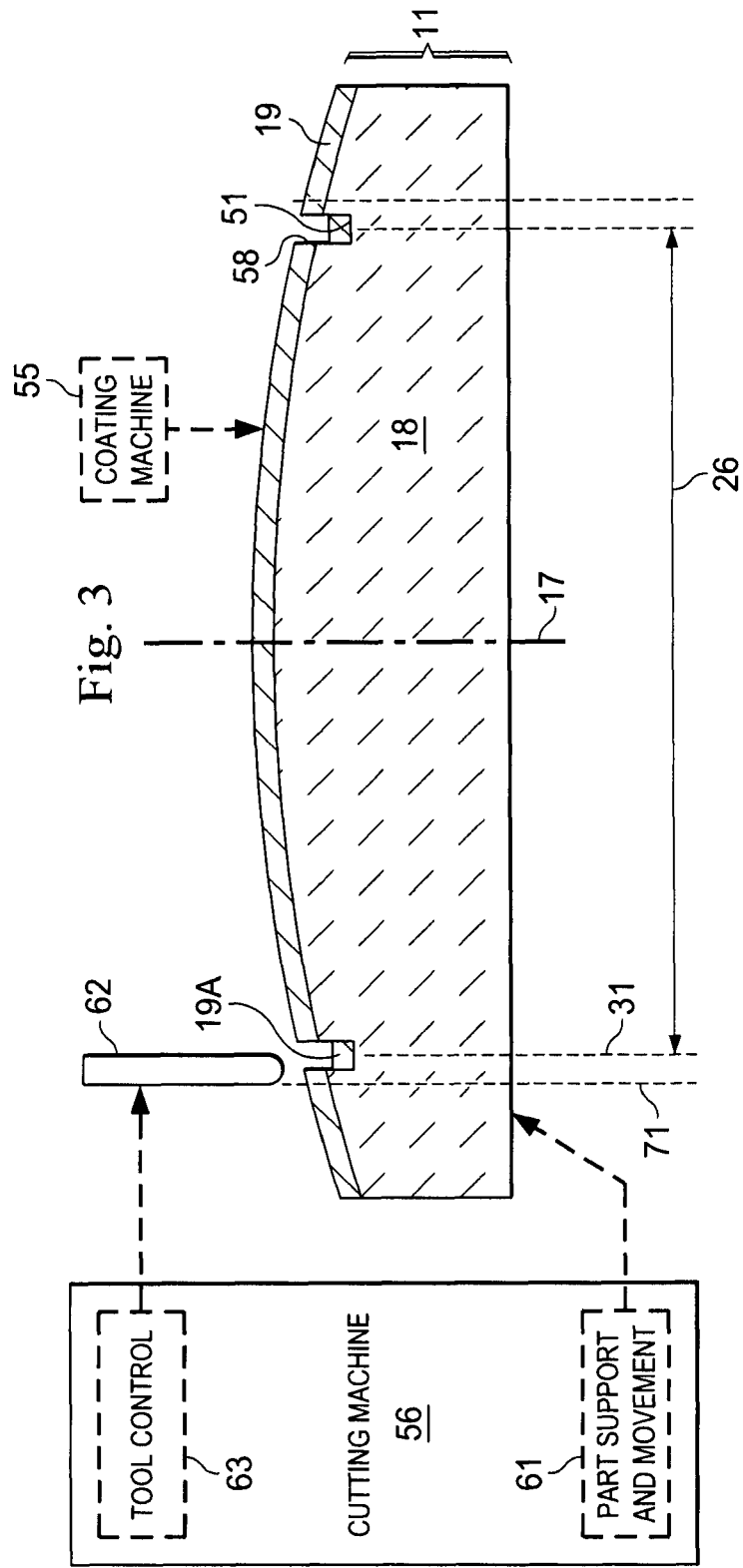
FIG. 3 is a diagrammatic view, partly in section, showing a coating machine, a cutting machine, and also the substrate of FIG. 2 with the coating formed thereon.

FIG. 3 is a diagrammatic view, partly in section, showing a coating machine 55 and a cutting machine 56, and also showing the optical component 11 with the coating 19 formed thereon. More specifically, after the groove 51 is created, the coating 19 is formed on the top surface of the substrate 18 by the coating machine 55. The coating machine 55 is conventional, and therefore not shown and described here in detail. In FIG. 2, the groove 51 is formed with a depth that is greater than the thickness of the coating 19. Thus, a portion 19A of the coating 19 is disposed in the bottom of the groove 51, but is not in contact with the remainder of the coating 19 that is on the top surface of the substrate 18. Alternatively, however, the groove 51 could be shallower, such that the portion 19A of the coating 19 is in contact with the remainder of the coating, but still defines a discontinuity in the coating. The portion of the coating 19 that is within the diameter 26 has a radially-outwardly facing edge surface 58 thereon.

The cutting machine 56 of FIG. 3 is conventional, and includes a part support and part movement section 61 that supports the optical component 11, and that rotates the optical component 11 about the optical axis 17. The cutting machine also includes a tool 62, and a tool control section 63 that can move the cutting tool 62 in directions parallel to the axis 17 with respect to the optical component 11. Due to the physical width of the tool 62, the cutting operation will remove an annular portion of the optical component 11 that is disposed between the cylindrical path 31 and a further cylindrical path 71, where the path 71 is concentric to and disposed radially outwardly of the path 31. In FIG. 3, it will be noted that the tool 62 is positioned radially so that, as it is moved downwardly to make the cut, it will not engage the edge surface 58 on the portion of coating 19 within the diameter 26.

Figure 4:
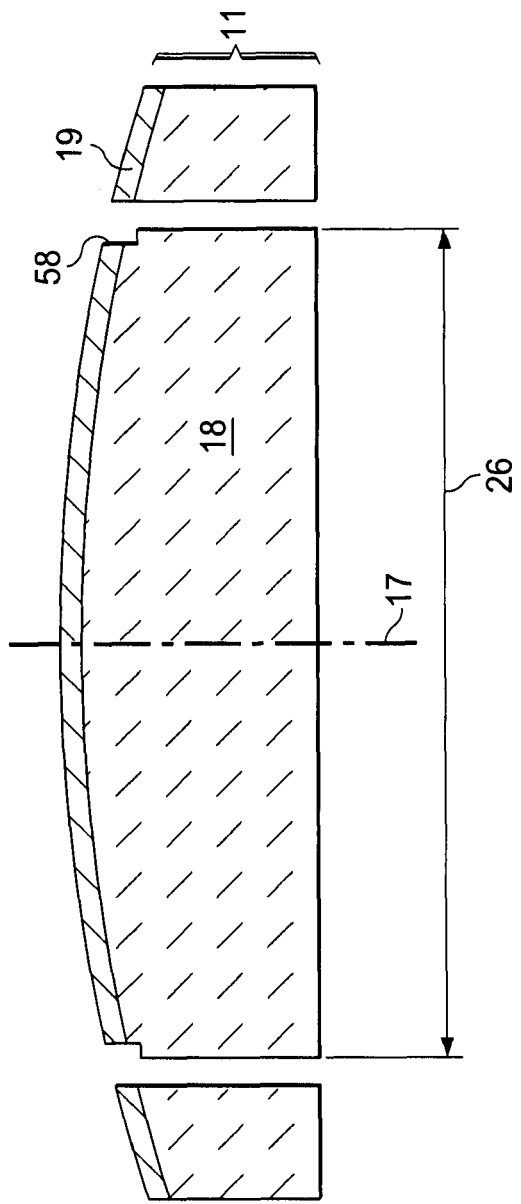
FIG. 4 is a diagrammatic sectional side view of the optical component, after the cutting machine of FIG. 3 has made a cut that has the effect of splitting the optical component into two physically separate portions.

FIG. 4 is a diagrammatic sectional side view of the optical component 11, after the cutting machine 56 of FIG. 3 has made the cut discussed above, which has the effect of splitting the optical component 11 into two physically separate portions. The resulting annular outer portion of the optical component 11 will be discarded, and the resulting central portion of the optical component within the diameter 26 will be retained and utilized. Most or all of the portion 19A of the coating 19 disposed within the groove 51 has been stripped away during the cutting operation. But the portion of the coating 19 on the central portion of the substrate 18 has experienced no significant physical damage, especially along its edge surface 58.

Figure 5:
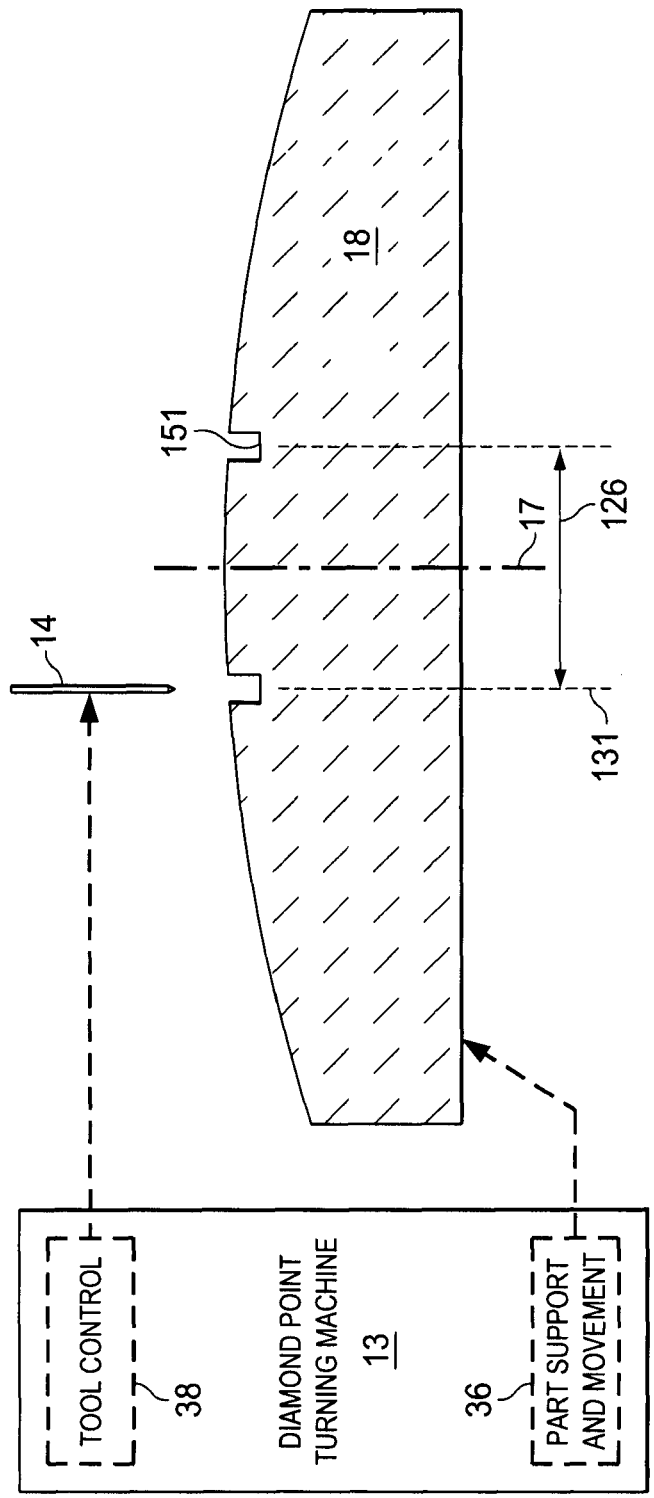
FIG. 5 is a diagrammatic view, partly in section, that is similar to FIG. 2 but that relates to a different way of cutting the optical component.

FIG. 5 is a diagrammatic view, partly in section, that is similar to FIG. 2 but that relates to a different way of cutting the optical component 11. In more detail, FIG. 5 shows the same substrate 18 that was shown in FIG. 2, but in this case a cylindrical hole with a diameter 126 is to be created in the center of the substrate, in particular by making a cut along a cylindrical path 131. The portion of the substrate 18 disposed radially inwardly of the cylindrical path 131 will be discarded, and the portion of the substrate disposed radially outwardly of the path 131 will be retained and utilized. The DPT machine 13 is used to create an annular groove 151 that is centered above the cylindrical path 131.

Figure 6:
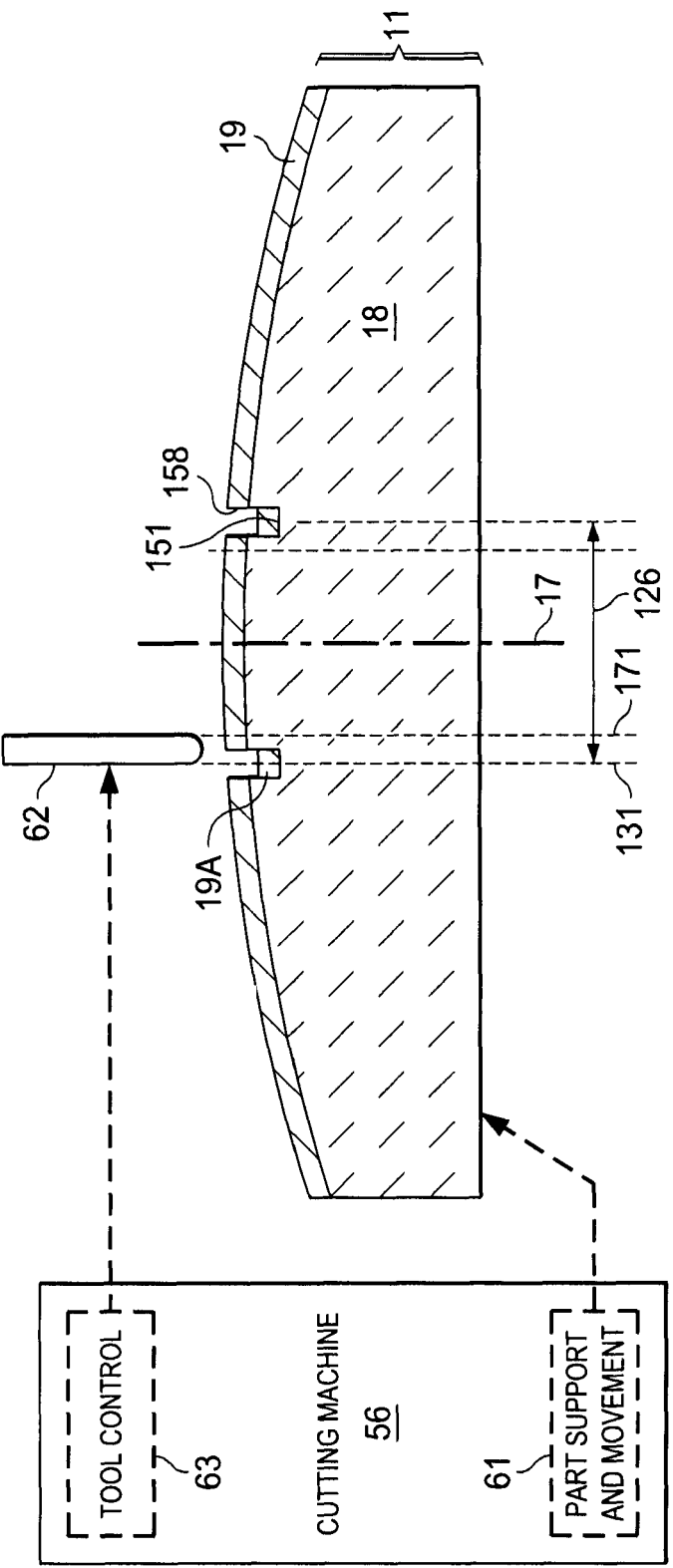
FIG. 6 is a diagrammatic view, partly in section, showing the substrate of FIG. 5 with the coating thereon, and also showing the cutting machine.

FIG. 6 is a diagrammatic view, partly in section, that is similar to FIG. 5, but shows the substrate 18 with the coating 19 formed thereon, and also shows the cutting machine 56. More specifically, after the groove 51 has been formed, the coating 19 is formed on the top surface of the substrate 18. In FIG. 2, the groove 151 is formed with a depth that is greater than the thickness of the coating 19. Thus, a portion 19A of the coating 19 is disposed in the bottom of the groove 151, but is not in contact with the remainder of the coating 19 that is on the top surface of the substrate 18. Alternatively, however, the groove 151 could be shallower, such that the portion 19A of the coating 19 is in contact with the remainder of the coating, but still defines a discontinuity in the coating. The portion of the coating 19 that is within the diameter 26 has a radially-inwardly facing edge surface 158 thereon.

Next, the tool 62 of the cutting machine 56 is used to cut the substrate 18. Due to the physical width of the tool 62, this cutting operation will remove a portion of the optical component 11 disposed between the cylindrical path 131 and a further cylindrical path 171 that is concentric to and disposed radially inwardly of the path 131. The tool 62 is positioned radially so that, as it is moved downwardly to make this cut, it will not engage the edge surface 158 on the portion of coating 19 disposed radially outwardly of the path 131.

Figure 7:
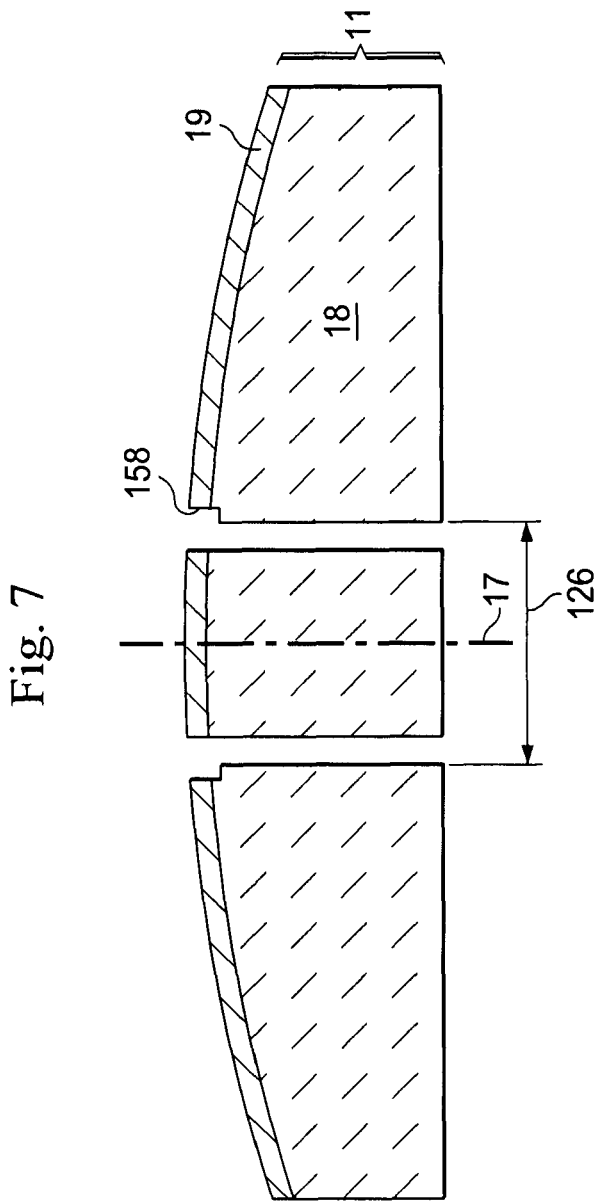
FIG. 7 is a diagrammatic sectional side view showing the optical component of FIG. 6 after the cutting machine has cut the substrate in a manner that has the effect of splitting the optical component into two physically separate portions.

FIG. 7 is a diagrammatic sectional side view showing the optical component 11 after the tool 62 has cut the substrate 18 in the manner discussed above in association with FIG. 6, which has the effect of splitting the optical component 11 into two physically separate portions. The central portion of the optical component 11 that is within the diameter 126 will be removed and discarded, and the annular outer portion of the optical component 11 will be retained and utilized. Most or all of the portion 19A of the coating 19 disposed within the groove 151 has been stripped away during the cutting operation. But the annular portion of coating 19 that is on the annular outer portion of the optical component 11 has not experienced any significant damage during the cutting process, especially in the radially inner region thereof along the edge surface 158.

The embodiments shown in FIGS. 1-8 and discussed above each involve a cut that happens to follow a circular path, but this is merely exemplary. The cut could follow paths having any of a variety of other shapes, including but not limited to a straight line, or a regular polygon such as a rectangle or an octagon. Moreover, the cut does not necessarily have to follow a path, but could for example involve some other type of cut such as drilling of a hole, one example of which is discussed below.

Figure 8:
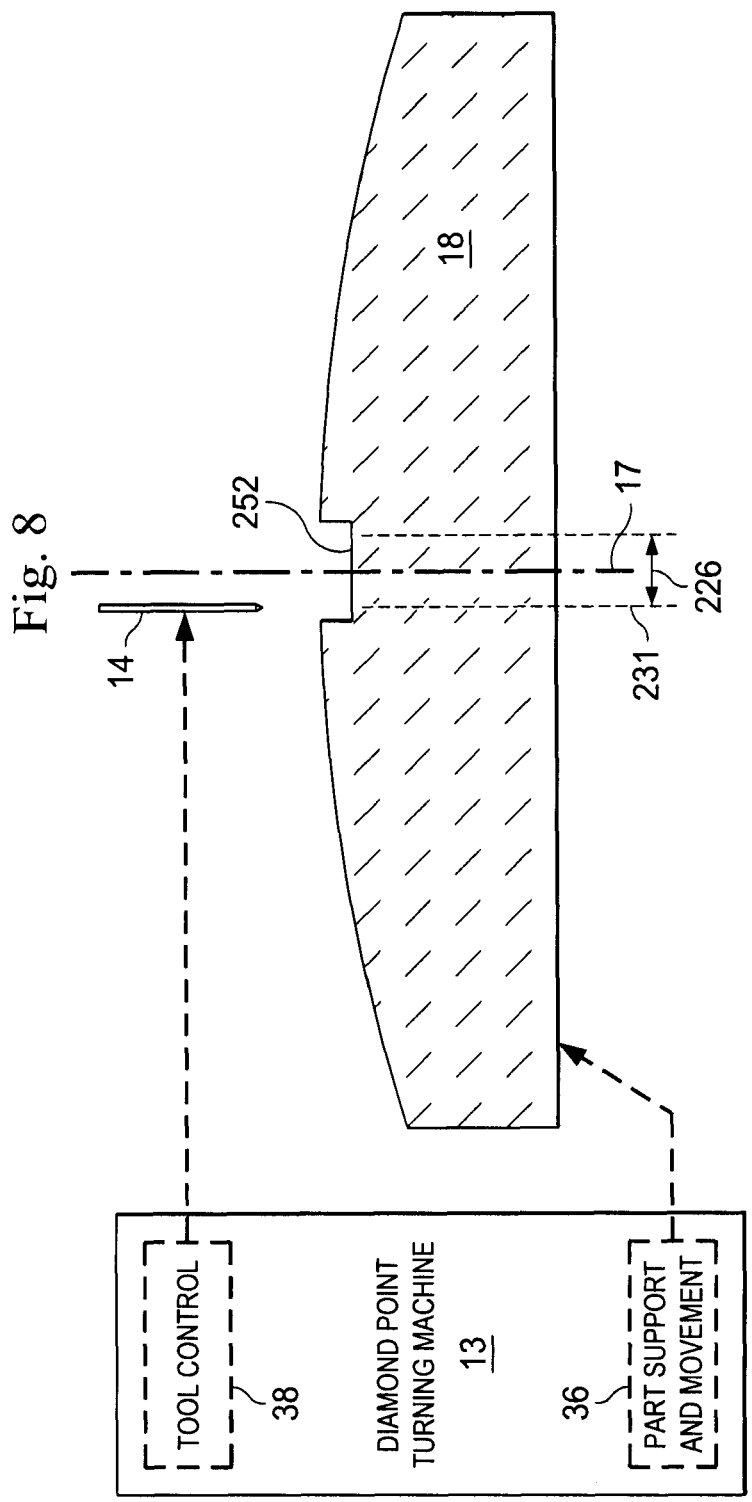
FIG. 8 is a diagrammatic view, partly in section, that is similar to FIG. 2, but that relates to yet another type of cut that can be made in the substrate.

In this regard, FIG. 8 is a diagrammatic view, partly in section, that shows the uncut substrate 18 and the DPT machine 13 of FIG. 2, but that relates to yet another type of cut that can be made in the substrate 18. More specifically, a hole of diameter 226 is to be made through the center of the substrate, where the diameter 226 is significantly smaller than the diameter 126 discussed above in association with FIGS. 4-6. In this case, rather than an annular groove, the DPT tool 14 of the machine 13 is used to create a circular recess 252 having a diameter that is slightly greater than the diameter 226. The circular recess 252 is concentric to the optical axis 17. In effect, the optical component 11 will be cut along a cylindrical path 231.

Figure 9:
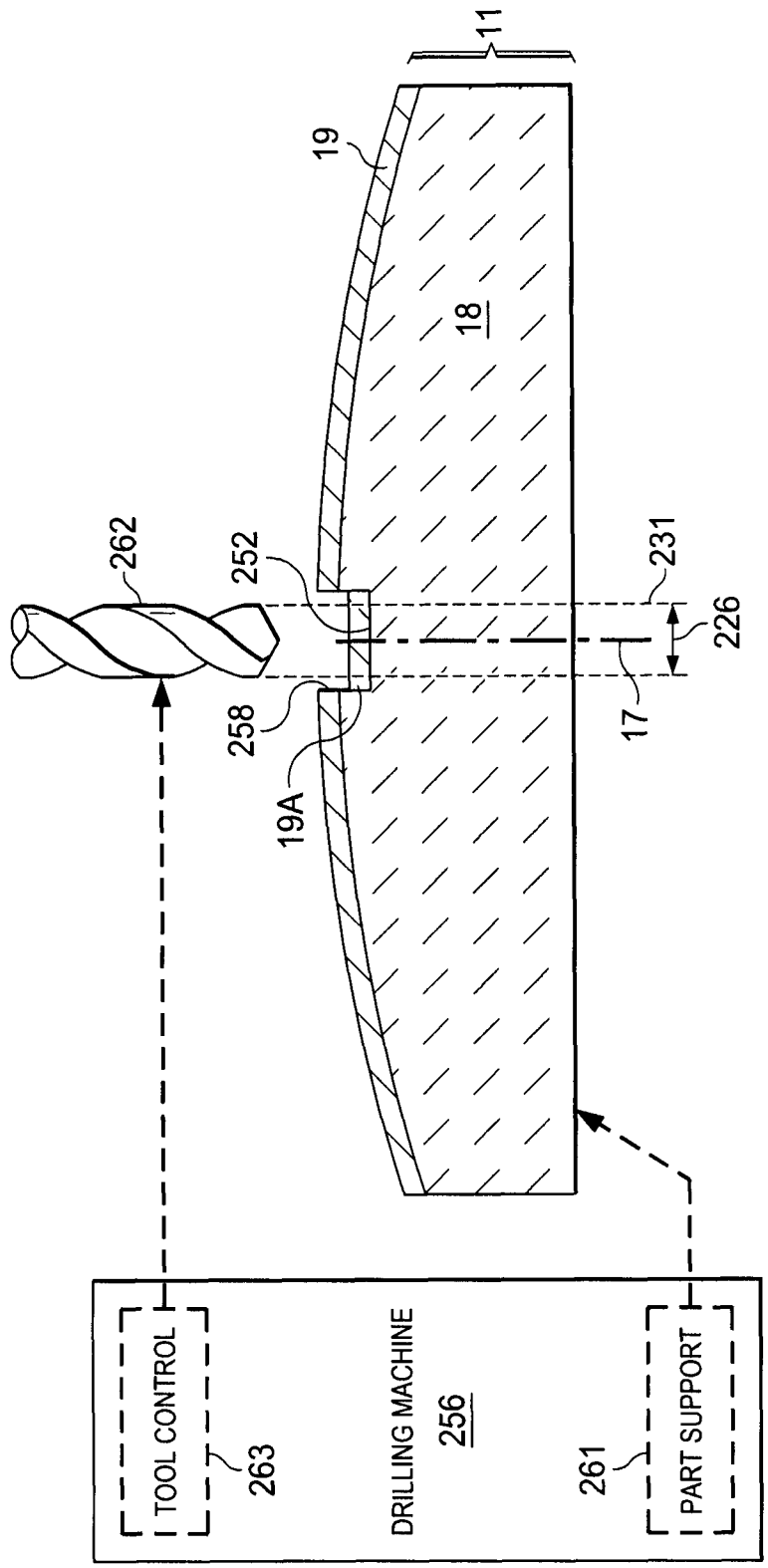
FIG. 9 is a diagrammatic view, partly in section, showing the substrate of FIG. 8 with the coating thereon, and also showing a drilling machine.

FIG. 9 is a diagrammatic view, partly in section, showing the substrate 18 with the coating 19 formed thereon, and showing a drilling machine 256. More specifically, after the circular recess 252 has been formed, the coating 19 is formed on the top surface of the substrate 18. In FIG. 2, the recess 252 is formed with a depth that is greater than the thickness of the coating 19. Thus, a portion 19A of the coating 19 is disposed in the bottom of the recess 252, but is not in contact with the remainder of the coating 19 that is on the top surface of the substrate 18. Alternatively, however, the recess 252 could be shallower, such that the portion 19A of the coating 19 is in contact with the remainder of the coating, but still defines a discontinuity in the coating. The portion of the coating 19 that is within the diameter 26 has a radially-inwardly facing edge surface 258 thereon.

The drilling machine 256 is conventional, and includes a part support section 261 that stationarily supports the optical component 11. The drilling machine 256 also includes a tool in the form of a bit drill 262 with a diameter equal to the diameter 226, and a tool control section 263 that can rotate the drill bit 262, while moving the drill parallel to the axis 17. The drill bit 262 is used to drill a hole through the substrate 18. Since the recess 252 has a diameter that is slightly larger than the diameter of the drill bit 262, the drill bit does not contact the edge surface 258 on the coating 19 as the drill creates the hole through substrate 18.

Figure 10:
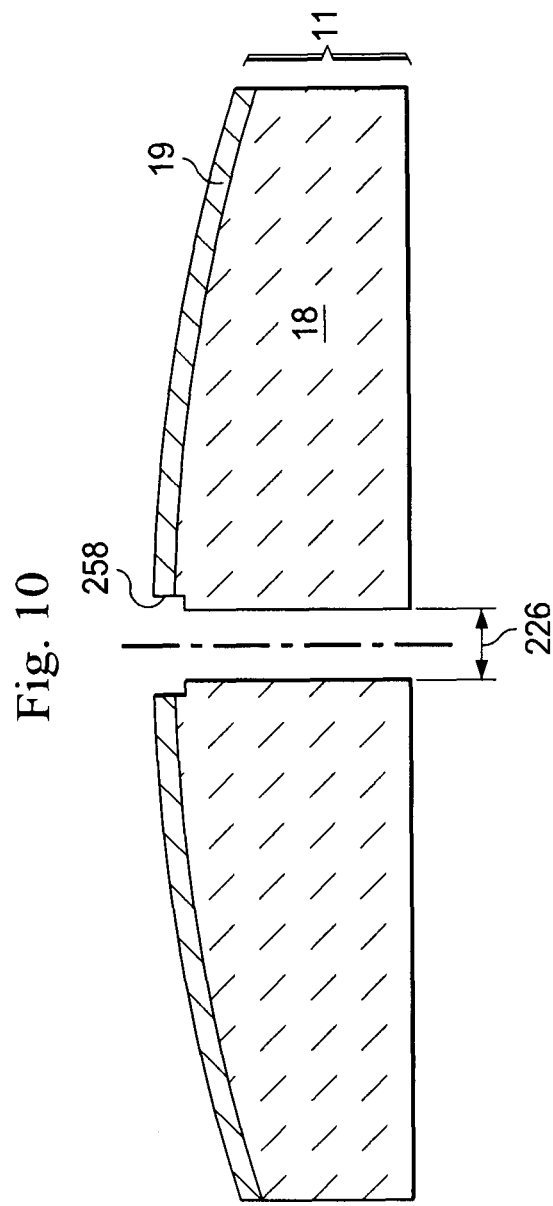
FIG. 10 is a diagrammatic sectional side view of the optical component of FIG. 8, after a hole has been drilled therethrough by the drilling machine.

FIG. 10 is a diagrammatic sectional side view of the optical component 11 of FIGS. 8 and 9, after a hole has been drilled therethrough by the drill bit 262 of the drilling machine 256. The drilling operation has removed the portion of the optical component 11 disposed radially inwardly of the diameter 226, leaving an annular outer portion that is retained and utilized. The portion of the coating 19 on this annular outer portion is substantially free of damage, especially in the region of the annular edge surface 258. Most or all of the portion 19A of the coating 19 disposed within the recess 252 has been stripped away during the cutting operation.

Although selected embodiments have been illustrated and described in detail, it should be understood that a variety of substitutions and alterations are possible without departing from the spirit and scope of the present invention, as defined by the claims that follow.

What is claimed is:

1. A method of configuring an optical part comprising:
   creating a recess in a surface of said optical part so that said recess is adjacent a portion of said optical part;
   thereafter forming a coating on said surface of said optical part, a first portion of said coating being disposed in said recess and a second portion of said coating forming a first side surface and a second side surface adjacent an edge of said recess, said first and second side surfaces positioned opposite each other; and
   thereafter removing material of said first portion and said first side surface of said optical part with a tool.

2. The method according to claim 1,
   wherein said removing is carried out so that said second side surface of said coating is free of contact with said tool during said removing.

3. The method according to claim 1,
   wherein said creating is carried out in a manner so that said recess has a depth that is greater than a thickness of said coating.

4. The method according to claim 1,
   wherein said creating is carried out in a manner so that said recess has a depth that is less than a thickness of said coating.

5. The method according to claim 1,
   wherein said creating is carried out with a further tool different from said tool used for said removing.

6. The method according to claim 1,
   wherein said creating includes utilizing diamond point turning to create said recess.

7. The method according to claim 1,
   wherein said creating is carried out in a manner so that said recess is an annular groove approximately concentric to an axis extending approximately perpendicular to said surface.

8. The method according to claim 7,
   wherein said forming is carried out in a manner so that said first side surface faces toward said axis and said second side surface faces away from said axis, and said first portion of said coating being annular and being disposed radially outwardly of said second side surface; and
   wherein said removing is carried out so that said second side surface of said coating is free of contact with said tool during said removing.

9. The method according to claim 8,
   wherein said first portion of said coating is positioned in between said first and second side surfaces of said second portion; and
   wherein said removing is carried out in a manner that creates a third side surface of said second portion and results in separation of said first and third side surfaces.

10. The method according to claim 7,
    wherein said forming is carried out in a manner so that said first side surface faces away from said axis and second side surface faces toward said axis, and said first portion of said coating being disposed radially inwardly of said second side surface; and
    wherein said removing is carried out so that said first side surface of said coating is free of contact with said tool during said removing.

11. The method according to claim 10,
    wherein said first portion of said coating is positioned in between said first and second side surfaces of said second portion; and
    wherein said removing is carried out in a manner that creates a third side surface of said second portion and results in separation of said first and third side surfaces.

12. The method according to claim 1,
    further including configuring said optical part by splitting said optical part into a first and a second section that are physically separate from each other, said first section including said second side surface.

13. The method according to claim 12,
    further including configuring said optical part to be a lens by retaining and utilizing said first section of said optical part.

14. The method according to claim 9,
    wherein said removing has the effect of splitting said optical part into a first section and a second section, said first section including said second side surface and forming a central annular portion, and said second section including said third side surface and forming an outer annular portion, the method further comprising retaining and utilizing said first section and discarding said second section.

15. The method according to claim 1, wherein said recess is spaced inwardly from an edge of said optical part.

16. The method of claim 1, wherein said removing further comprises rotating said optical part about an axis extending approximately perpendicular to said surface.

17. The method of claim 16, wherein said removing further comprises creating a circular path that is concentric to said axis.

* * * * *